April 8, 1952 A. JAERN ET AL 2,592,150
ADJUSTABLE CALK FOR PNEUMATIC VEHICLE TIRES
Filed Dec. 30, 1947
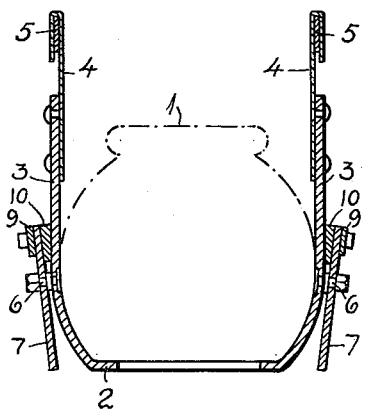
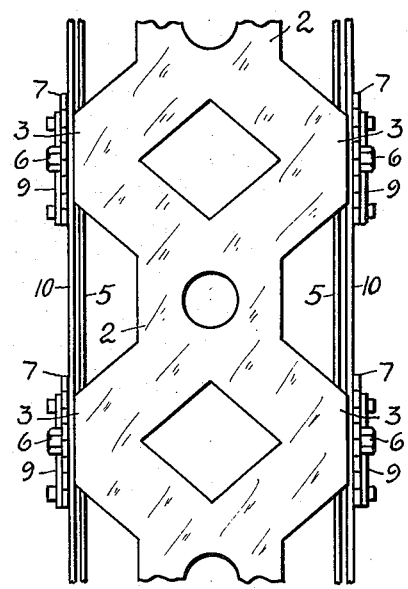
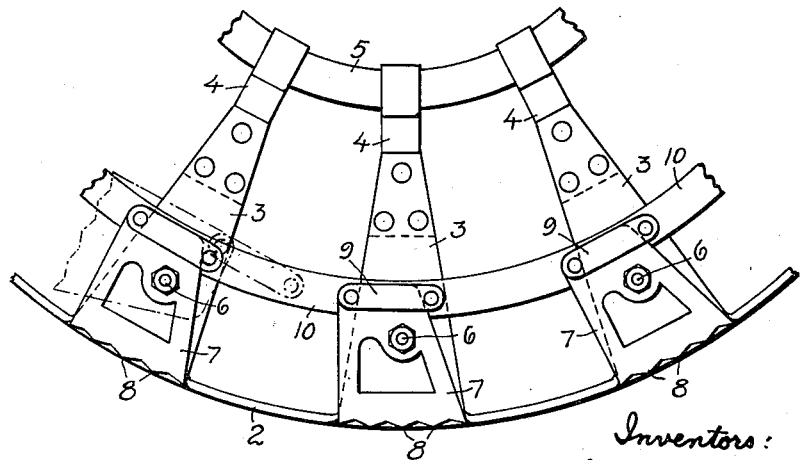
Inventors:
Albert Jaern and
Leif Eriksen
By: [signature]

Patented Apr. 8, 1952

2,592,150

UNITED STATES PATENT OFFICE 2,592,150

ADJUSTABLE CALK FOR PNEUMATIC VEHICLE TIRES

Albert Jaern and Leif Eriksen, Oslo, Norway

Application December 30, 1947, Serial No. 794,480
In Norway February 27, 1946

4 Claims. (Cl. 152—213)

The present invention relates to a calk arrangement for pneumatic vehicle tires, of the type in which a number of organs serving as calks are distributed along the circumference of the wheel tire, at one or both sides thereof, in such manner that the calks may grip into the road when driving.

The object of the present invention is to provide simple means whereby said calks may be moved out of or into operative position as desired.

Another object is to provide for a resilient arrangement of the attachment points of the calks, whereby the calks, in operative position thereof, may shift a little vertically and so adjust themselves in relation to unevenness occurring on the road.

The invention will be more fully described with reference to the annexed drawing disclosing an embodiment thereof by way of example.

In the drawing:

Figure 1 is a vertical section of the arrangement,

Figure 2 shows part of the arrangement as seen at right angles to the axis of the wheel, and Figure 3 is a partial side view of the arrangement.

A wheel tire 1 of usual type is shown in dash-dotted lines. Around the circumference of said tire is provided a ring 2 of resilient material, for instance rubber, said ring is pressed against the tire by being placed thereon when the tire is not yet inflated, so that inflation of the tire will bring about the necessary pressure.

At each side of the ring 2 and preferably integral therewith, are arranged tongues 3 evenly distributed on the circumference of the ring. At its free end each of the tongues is provided with hook-shaped members 4, by means of which each tongue is detachably attached to a support ring 5, that is concentrically placed in relation to the wheel axis.

Each tongue has attached thereto a pin or pivot 6 on which is pivotally mounted a calk element 7. Said element is preferably, as shown, formed with a number of projections or prongs 8, substantially coincident with the outer circumference line of the ring 2. Above said pivot 6 each element 7 has linked thereto one end of a link 9, the other end of which is linked to an adjustment ring 10, that is loosely mounted on the side of the wheel. The adjustment ring 10 and the links 9 form a control mechanism for bringing the calk elements 7 designed as plates in and out of operative position.

In the position shown in full lines the pronged edge of the element cooperates with the road and prevents sliding of the wheel. By turning the ring 10 counter-clockwise, as seen in Figure 3, the links 9 will turn the elements 7 so that the pronged edges thereof no longer make contact with the road during driving. This position of the elements 7 is indicated in dotted lines at the left part of Figure 3.

By the calk elements being attached to tongues of resilient material they are resiliently supported in operative position, which enables each element to shift somewhat in vertical direction, to adjust itself for unevennesses on the road.

Calk elements may be provided at one side only of the ring 2. The elements may be attached to non-resilient supports and their movement may take place radially or in any other suitable direction. Means may be provided for moving the elements one at a time, or by groups instead of all at one time.

We claim:

1. In a calk arrangement for pneumatic vehicle tires, in combination, a wheel having a pneumatic tire; a ring of resilient material arranged on the circumference of said tire and including a tread portion and a plurality of radial tongues arranged oppositely to one another on the sides of said tread portion and having free ends; two support rings located oppositely to each other on the sides of said wheel and concentrically with respect to the axis of said wheel, said free ends of said tongues being detachably connected to said support rings, respectively; a plurality of pivot pins secured, respectively, to said tongues at least at the outer side of said wheel; a plurality of calk elements pivoted, respectively, to said pins; and means for bringing said calk elements in and out of operative position.

2. In a calk arrangement for pneumatic vehicle tires, in combination, a wheel having a pneumatic tire; a ring of resilient material arranged on the circumference of said tire and including a tread portion and a plurality of radial tongues arranged oppositely to one another on the sides of said tread portion and having free ends; two support rings located oppositely to each other on the sides of said wheel and concentrically with respect to the axis of said wheel, said free ends of said tongues being detachably connected to said support rings, respectively; a plurality of pivot pins secured, respectively, to said tongues at least at the outer side of said wheel; a plurality of plates pivoted, respectively, to said pins and having each an edge, each of said plates being rotatable with respect to the associated tongue; and a control mechanism for bringing said plates in and out of operative position, said edges in operative position of said plates being concentric with the outer circumference of said ring of resilient material.

3. In a calk arrangement for pneumatic vehicle tires, in combination, a wheel having a pneumatic tire; a ring of resilient material arranged on the circumference of said tire and including a tread portion and a plurality of radial tongues arranged oppositely to one another on the sides of said tread portion and having free ends; two support rings located oppositely to each other on the sides of said wheel and concentrically with respect to the axis of said wheel, said free ends of said tongues being detachably connected to said support rings, respectively; a plurality of pivot pins secured, respectively, to said tongues at least at the outer side of said wheel; a plurality of calk elements pivoted, respectively, to said pins; an adjustment ring arranged concentrically with respect to the axis of said wheel and displaceably with respect to said wheel; a link connection between said adjustment ring and each of said calk elements, whereby said calk elements can be brought in and out of operative position by displacing said adjustment ring with respect to said wheel.

4. In a calk arrangement for pneumatic vehicle tires, in combination, a wheel having a pneumatic tire; a ring of resilient material arranged on the circumference of said tire and including a tread portion and a plurality of radial tongues arranged oppositely to one another on the sides of said tread portion and having free ends; two support rings located oppositely to each other on the sides of said wheel and concentrically with respect to the axis of said wheel, said free ends of said tongues being detachably connected to said support rings, respectively; a plurality of pivot pins secured, respectively, to said tongues at least at the outer side of said wheel; a plurality of plates pivoted, respectively, to said pins and having each an edge, each of said plates being rotatable with respect to the associated tongue; an adjustment ring arranged concentrically with respect to the axis of said wheel and displaceably with respect to said wheel; a link connection between said adjustment ring and each of said plates, said edges in operative position of said plates being concentric with the outer circumference of said ring of resilient material.

ALBERT JAERN.
LEIF ERIKSEN.

REFERENCES CITED

The following references are of record in the file of this patent:

UNITED STATES PATENTS

| Number | Name | Date |
|--------|------|------|
| 774,246 | Herrick | Nov. 8, 1904 |
| 1,753,519 | Kanner | Apr. 8, 1930 |
| 1,949,807 | Moe | Mar. 6, 1934 |
| 2,434,017 | Snedeker | Jan. 6, 1948 |